(12) United States Patent
da Rocha et al.

(10) Patent No.: US 11,681,767 B2
(45) Date of Patent: Jun. 20, 2023

(54) RANKING SERVICES AND TOP N RANK LISTS

(71) Applicant: Infoblox Inc., Santa Clara, CA (US)

(72) Inventors: Laura Teixeira da Rocha, Tacoma, WA (US); Renee Carol Burton, Sykesville, MD (US)

(73) Assignee: Infoblox Inc., Santa Clara, CA (US)

( * ) Notice: Subject to any disclaimer, the term of this patent is extended or adjusted under 35 U.S.C. 154(b) by 90 days.

(21) Appl. No.: 17/161,436

(22) Filed: Jan. 28, 2021

(65) Prior Publication Data

US 2021/0240791 A1  Aug. 5, 2021

Related U.S. Application Data

(60) Provisional application No. 62/968,825, filed on Jan. 31, 2020.

(51) Int. Cl.
| | | |
|---|---|---|
| *G06F 16/00* | (2019.01) | |
| *G06F 16/9536* | (2019.01) | |
| *G06F 16/2457* | (2019.01) | |
| *H04L 61/4511* | (2022.01) | |

(52) U.S. Cl.
CPC .... *G06F 16/9536* (2019.01); *G06F 16/24578* (2019.01); *H04L 61/4511* (2022.05)

(58) Field of Classification Search
CPC ........... G06F 16/9536; G06F 16/24578; H04L 61/4511
See application file for complete search history.

(56) References Cited

U.S. PATENT DOCUMENTS

| | | | | |
|---|---|---|---|---|
| 2017/0155562 | A1* | 6/2017 | Vasant | .................... H04L 63/20 |
| 2020/0351270 | A1* | 11/2020 | Burton | .................. H04L 63/145 |

OTHER PUBLICATIONS

Author Unknown, "A Science of Cities: Rank Clocks", captured Jan. 24, 2020.
Author Unknown, "CI*Rank: Ranked Incidence and Mortality Rates by State, County, and Special Region", National Cancer Institute, Division of Cancer Control and Population Sciences, captured Nov. 6, 2020. Retrieved from https://web.archive.org/web/20201106000528/https:/surveillance.cancer.gov/cirank/ on Apr. 5, 2021.
Diaa Al Mohamad et al., "An improvement of Tukey's HSD with application to ranking institutions"; Leiden University Medical Center, The Netherlands; Aug. 9, 2017.
Diaa Al Mohamad, "Simultaneous Confidence Intervals for Ranks With Application to Ranking Institutions", Nov. 26, 2018.

(Continued)

*Primary Examiner* — Hung Q Pham
(74) *Attorney, Agent, or Firm* — Van Pelt, Yi & James LLP

(57) ABSTRACT

Techniques for ranking services and top N rank lists are disclosed. In some embodiments, a system, process, and/or computer program product for ranking services and top N rank lists includes receiving a set of network related event data, wherein the set of network related event data includes Domain Name System (DNS) related event data; aggregating the DNS related event data over a period of time and rank order by popularity; and generating a top N rank list for ranking popularity over the period of time for a set of domains using the aggregated DNS related event data and rank order by popularity.

6 Claims, 12 Drawing Sheets

(56) References Cited

OTHER PUBLICATIONS

E Clare Marshall et al., "Reliability of league tables of in vitro fertilisation clinics: retrospective analysis of live birth rates", BMJ vol. 316, Jun. 6, 1998.

Hamish Oglivy, "Reinforcement learning assisted search ranking", Medium, Jan. 10, 2018.

Jean Morrison et al., "Rank conditional coverage and confidence intervals in high dimensional problems", Department of Biostatistics, University of Washington, Seattle, WA, Feb. 24, 2017.

Jean Morrison et al., "Rank Conditional Coverage and Confidence Intervals in High-Dimensional Problems", from https://www.ncbi.nlm.nih.gov/pmc/articles/PMC6364309/, Jun. 14, 2018.

Luca Becchetti et al., "The Distribution of PageRank Follows a Power-Law only for Particular Values of the Damping Factor", WWW2006, May 22-26, 2006, Edinburgh, UK.

M. E. J. Newman, "Power laws, Pareto distributions and Zipf's law", Department of Physics and Center for the Study of Complex Systems, University of Michigan, Ann Arbor, MI 48109, U.S.A. May 29, 2006.

O'Madadhain et al., "Prediction and Ranking Algorithms for Event-Based Network Data", SIGKDD Explorations, vol. 7, Issue 2., Dec. 2005.

Pochat et al., "TRANCO: A Research-Oriented Top Sites Ranking Hardened Against Manipulation", Dec. 17, 2018.

Quirin Scheitle et al., "A Long Way to the Top: Significance, Structure and Stability of Internet Top Lists", Sep. 23, 2018.

Rick Wicklin, "Ranking with confidence: Part 1", from https://blogs.sas.com/content/iml/2011/03/25/ranking-with-confidence-part-1.html, Mar. 25, 2011.

Roger Newson, "Confidence intervals for rank statistics: percentile slopes, differences and ratios", STATA Journal, vol. 6, pp. 497-520, ISSN: 1536-867X, 2006.

Ting Bie, "Confidence Intervals for Ranks: Theory and Applications in Binomial Data", Department of Statistics, Uppsala University, 2013.

Tom Callahan et al., "On Modern DNS Behavior and Properties", Case Western Reserve University, International Computer Science Institute, 2013.

Walter Rweyemamu et al., "Clustering and the Weekend Effect: Recommendations for the Use of Top Domain Lists in Security Research", 2019.

Zheng Wang, "Analysis of DNS Cache Effects on Query Distribution", The Scientific World Journal, Jul. 31, 2013.

* cited by examiner

US 11,681,767 B2

RANKING SERVICES AND TOP N RANK LISTS

CROSS REFERENCE TO OTHER APPLICATIONS

This application claims priority to U.S. Provisional Patent Application No. 62/968,825 entitled RANKING SERVICES AND TOP N RANK LISTS filed Jan. 31, 2020, which is incorporated herein by reference for all purposes.

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response).

BRIEF DESCRIPTION OF THE DRAWINGS

Various embodiments of the invention are disclosed in the following detailed description and the accompanying drawings.

DETAILED DESCRIPTION

Figure 1:
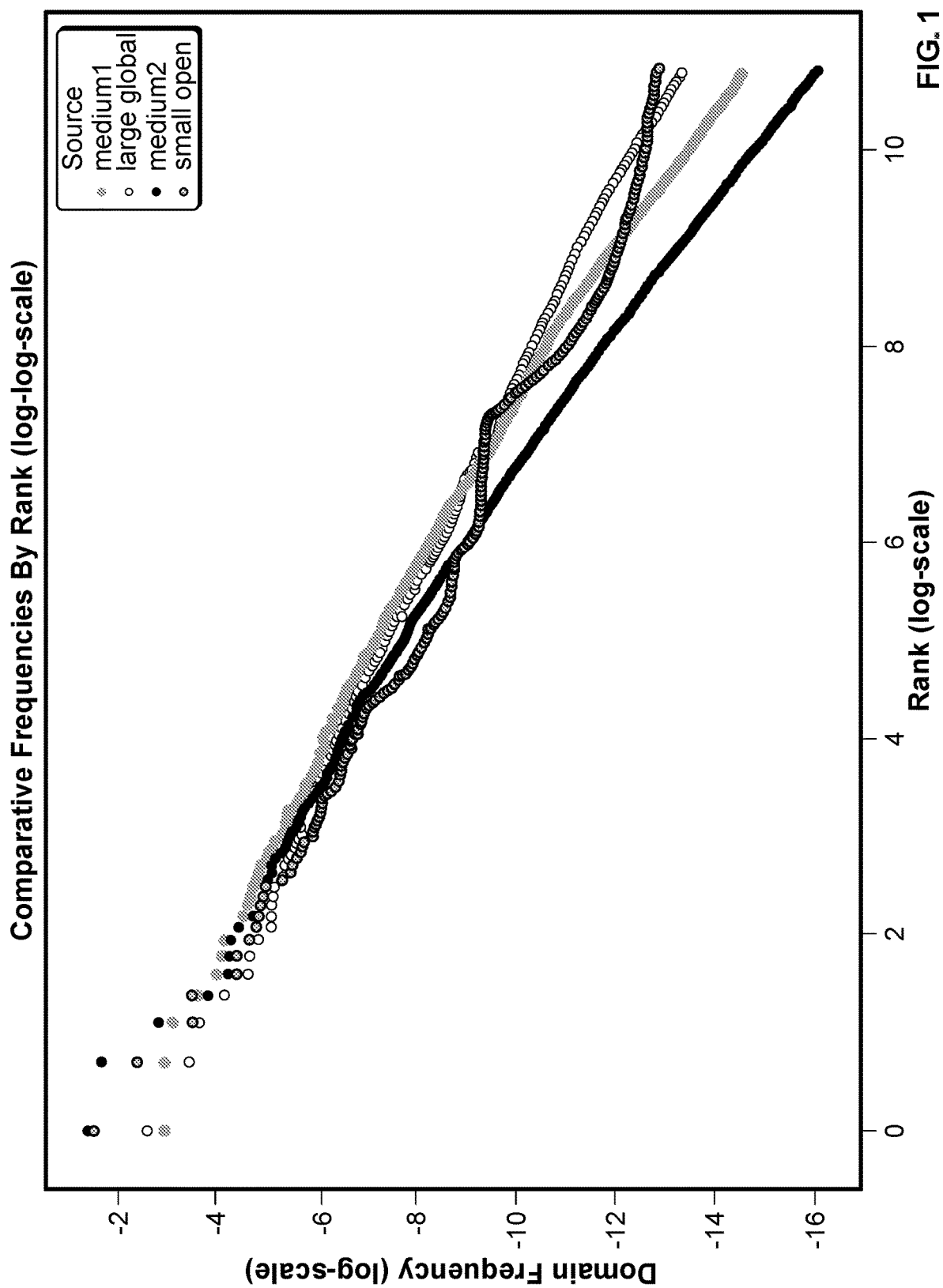
FIG. 1 is a plot that illustrates comparative frequencies by rank of domains using a log-log scale in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generally, a client (e.g., a computing device) attempts to connect to a server(s) (e.g., a web server) over the Internet by using web addresses (e.g., Uniform Resource Locators (URLs) including domain names or fully qualified domain names (FQDN)); the aforesaid are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain).

DNS network services are generally ubiquitous in IP-based networks. However, new and improved DNS security techniques are needed for effectively identifying domains that can be allowed (i.e., as such are trusted domains/not security risks), blocked (i.e., as such are not trusted/security risks), and/or monitored using security enforcement, such as by various DNS related network/security monitoring devices/solutions.

Accordingly, various system and process embodiments for performing the disclosed techniques for ranking services and top N ranked lists will now be further described below.

INTRODUCTION

InfoRanks is a term as used herein that generally refers to the creation of statistically significant rank lists. The goal is to create a list of popular domains that reduces the impact of variance in the data environment to create accurate ranks (e.g., to create a list of accurate popular domains that takes into account variance in the data environment). This approach is robust to variability in the data and intends to reflect a domain's most likely rank based on statistical inference techniques, reducing the effect of noise on the rank. The disclosed techniques provide insights about rank stability and confidence over time.

In a broader context, rank lists are widely used to summarize meaningful information about a topic of interest. Some common rank lists are, for example, top 10 popular music songs on the Internet and top 10 largest countries in the world. Specific to the security industry, some companies provide a list of the most popular websites on the Internet that can be measured in different ways, such as the number of website visits or the number of times a website has been referenced to, as examples.

Internet rank lists (e.g., domain and IP rank lists) are widely used in industry and academia for security and Internet optimization applications. Infoblox, for example, has implemented a technique to identify domains which should generally be allowed in its security products. This technique utilizes rank lists. Security operation centers (SOCs) use rank to verify the likelihood of a threat in their network. Rank lists are also used to fill DNS resolver caches for higher performance. There are a number of publicly available lists, as well as privately maintained lists.

Unfortunately, rank lists based on observation counts are inherently problematic due to the nature of Internet data. Various embodiments and techniques described below focus on the application of domain rankings, although it will be apparent to one of ordinary skill in the art that the disclosed techniques can be similarly applied to other Internet elements (or any other data associated with ranks), such as IP addresses. Additionally, while the disclosed embodiments generally focus on rank determined by observation counts, it will be apparent to one of ordinary skill in the art that the disclosed techniques can be similarly applied generally to other methods of determining rank, such as PageRank.

External and internal research on the publicly available rank lists, such as Amazon's Alexa Top 1 Million domains, have shown that the ranks can have high variability across a period of time (e.g., over a period of days). Ranks based on observation counts in a network can be influenced by a number of factors, including collection issues, congestion in the network, seasonality, user trends, and/or other factors. For example, a marketing campaign or new event may drive traffic toward a certain domain, cause counts to rise temporarily, or a configuration may reduce traffic to another domain. Moreover, Internet traffic generally follows Zipf's Law as a distribution model, which implies that small amounts of noise in the environment can greatly impact the order as the domain becomes less popular.

Commercially available DNS related products/solutions that rely on such lists may be impacted by this instability. In contrast, the disclosed techniques provide a ranking system for domains (e.g., which can be similarly applied to other data, such as IP addresses) that provide both a range of plausible ranks for a given item, as well as the most likely single rank during a given time period within the observations. In one embodiment, a statistical inference technique is applied to create a statistically significant rank list that gives information about a domain's stability over time, thereby increasing the confidence of its most likely rank.

In one embodiment, data over a period of time is combined to define a rank confidence interval for each domain. Highly popular domains (e.g., google[.]com) will result in smaller confidence interval ranges with lower variation, which indicates stability in the rank. We obtain these results by aggregating historical data over a period of time (e.g., across a week) and simulating its ranking with a bootstrap sampling technique as will be further described below. This approach generates repeated values that will be used to estimate the rank's likelihood. It also generates unbiased estimators, as it uses a sampling technique with replacement where each rank/value has the same probability of being selected in each round thereby avoiding selection bias.

In an example implementation, we can define how certain we want to be about a domain's rank range (e.g., if we want to be highly confident about the rank's range, we can choose to compute a 99% confidence interval), creating bigger ranges for each rank. A 99% confidence interval will generally have a stronger statistical significance of 0.01%, as it incorporates more cases for the rank values. If we want to be less strict about it, we can choose 90% confidence intervals that will generate smaller ranges of ranks for a specific domain.

We can then use the bootstrap sampling technique to account for sampling bias, meeting assumptions that the data is approximately normally distributed and that the samples are randomly selected and independent of each other. This statistical data-driven approach is defensible as we can determine how confident we are about the results, that are robust to variability and that give information about its stability over time.

Sources of Instability

Suppose that the rank of a domain is defined as its index in a list of domains ordered by the number of DNS queries, or observations, of each domain daily (e.g., which is how Alexa Top 1M and Cisco Umbrella Top 1M are defined). If we consider the rank of any given domain within the list over several consecutive days, it is likely to vary, and the less popular the domain, the more widely the rank will vary. There are a number of sources of rank instability in domains, some inherent in the traffic and some due to external influences.

An unavoidable cause of rank instability is the natural distribution of DNS queries in a network. The rank of these queries is known to follow Zipf's Law, an inverse discrete power law distribution. The probability density function can be modeled as follows:

$$P(r) = Cr^{-\alpha},$$

where a is approximately 1.0 in the case of Internet domains, C is a scaling constant, and r≥0. Under this equation, the most popular domain would have rank 0, and the implication is that less popular domains differ in their underlying count by increasing small numbers. This opens the rankings up to perturbation caused by lost packets and other minor differences in traffic. Moreover, the smaller the collection apparatus, the more exacerbated this situation becomes.

FIG. 1 illustrates comparative frequencies by rank of domains using a log-log scale in accordance with some embodiments. Recall that this is a discrete distribution, and every value must be an integer. The constant C essentially reflects the size of the observation pool; small values of C create a quickly flat distribution. The implications of Zipf's Law in various sized collection apertures for DNS domain data are illustrated in FIG. 1. It is also known that rank data likely follows a broken power law distribution, meaning the value for a may change; this is visible in each source as shown in FIG. 1.

Figure 2:
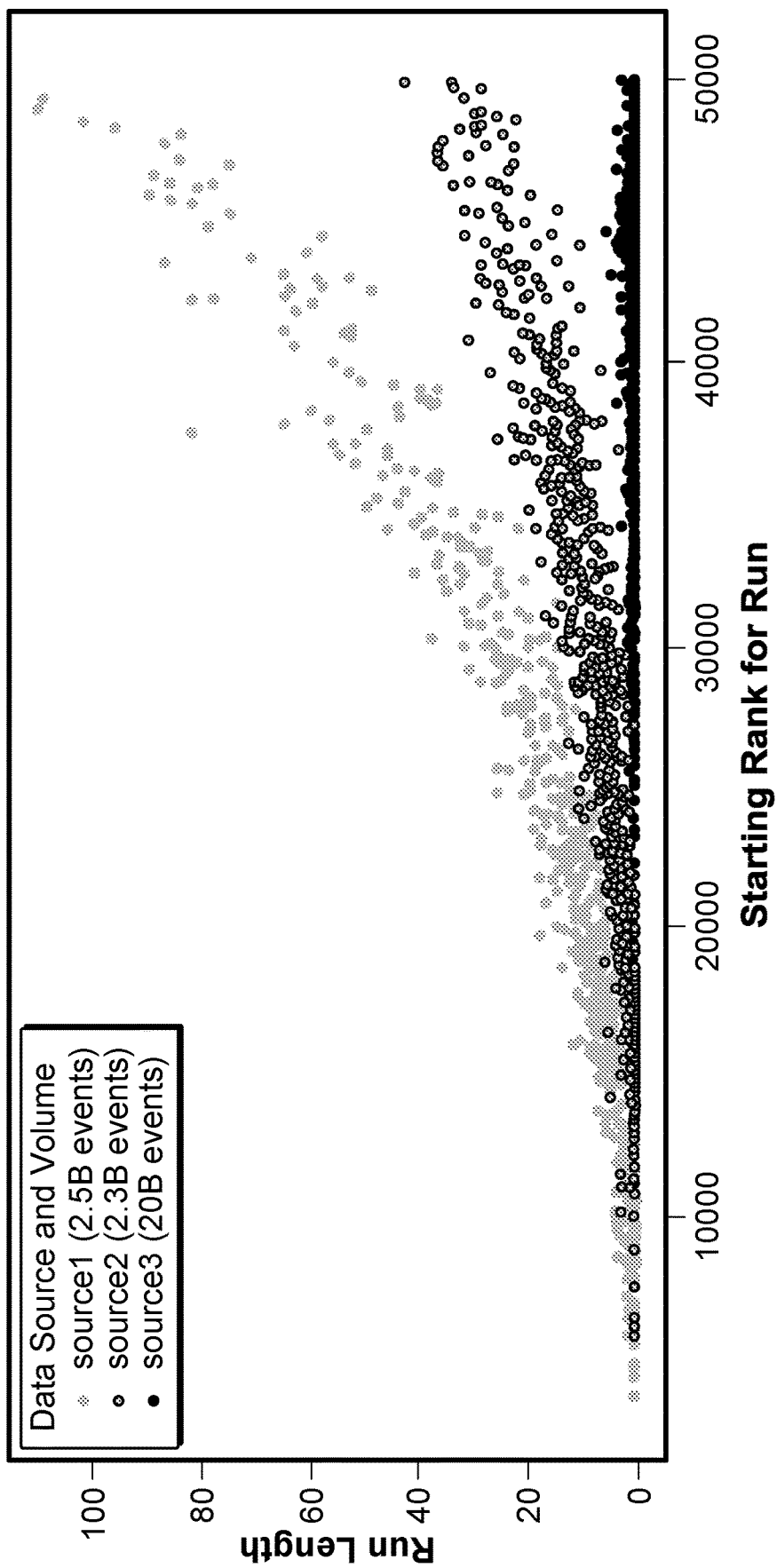
FIG. 2 is a plot that illustrates runs of event counts in different sources of DNS data in accordance with some embodiments.

FIG. 2 is a plot that illustrates runs of event counts in different sources of DNS data in accordance with some embodiments. Another way to think of this phenomenon is in terms of the counts themselves and the necessity of "runs" in the counts when creating rank order lists. In this context, a run is a series of domains that have the same observation count. Under Zipf's Law, these runs are inevitable: you cannot continue to decrease from a fixed number of items without eventually repeating a count. Again, the size of the collection aperture greatly impacts the lengths of these runs. Small collection sources are forced to soon have domains that are seen the same number of times, creating a run in their data. A comparison of three sized systems is shown in FIG. 2.

For the purposes of computing rank, Zipf's Law matters for multiple reasons. First, if there are 100 domains that are all observed the same number of times, what rank do you assign them? Traditional rank calculation in public lists either assigned them in alphabetical or random order, creating a potential immediate variance of 100 in the rank in this example. Second, there are numerous sources for noise on the Internet generally, and DNS specifically, including lost packets. With a 1% lost packet level, for example, domain counts may fluctuate, causing their rank to widely vary over a period of a few days with these methods. Domain counts in DNS are also influenced by the time-to-live (TTL) of DNS records, which may be changed by administrators, caching, and/or as a result of other networking/technological related reasons.

In addition to natural variance in observation counts, there are a number of external forces that can change a domain's rank in a network. For example, marketing and news events can cause significant swings in the popularity of a domain over a handful of days. Political campaign websites, for example, are known to have increased traffic surrounding a debate or vote. Marketing campaigns may drive users to a particular, and often newly established domain. Scandals in the news cause users to investigate, which may take them to smaller newspapers or other less popular websites temporarily. Seasonality associated with sports games or domains that are more associated with office responsibilities may vary depending on the day and time of day.

Moreover, malicious actors can cause variance in DNS traffic. For example, phishing domains typically have a strong, short-lived spike in traffic. As another example, malware command-and-control domains may operate over a short period of time, or in a cycle. As part of their defenses mechanisms, malware may make DNS queries for benign, relatively unpopular domains, causing an artificial rise in the popularity of those domains as well.

Finally, the observation, or collection, environment can greatly impact ranking and the interpretation of ranks generated by simple counts. For example, collection between authoritative name servers and recursive resolvers contains only cache misses from the recursive resolver. The cache time and whether the resolvers are configured to pre-fetch domains will impact the count of observed queries. Similarly, collection between a recursive resolver and clients, which may themselves be resolvers, will contain queries that are not cache misses for the entire network.

Techniques for Ranking Services and Top N Ranked Lists

Suppose we have an environment where we observe DNS queries, and we are able to collect and count the domains on some regular interval, such as daily. As described above, there is noise in these counts due to networking/technological factors and external factors as described above, and any single ordering is likely to be inaccurate. To overcome this technological problem, we assume that the data contains noise that over time we can statistically mitigate. Specifically, using the disclosed statistical measurements that can be performed over a period of time (e.g., several days), we can reduce the effect of outlier counts and converge on a statistically significant representative value and range as will be further described below. This section describes that process.

Given the population of D domains seen across a set period of time (e.g., a number of days), T, we want to determine a confidence interval for the rank of each domain $D_1, \ldots, D_n$. Each domain will have a daily rank $R_1, \ldots, R_T$, based on ordered observation counts, or some other measure. If T=7 days, we have seven ranks for a specific domain that we use to compute our confidence intervals, by domain. The confidence intervals are defined as shown in the below formula.

$$CI = X\text{bar} \pm Z_{\alpha}/2 * s$$

Using the formula, we will obtain the lower and upper boundary for the confidence intervals, defined here as (r1, r2) or (min rank, max rank). In order to compute the confidence intervals, we generally desire that our data meet the assumption of being approximately normally distributed. To approximate the daily T ranks associated with each domain to a normal distribution, we bootstrap samples for each domain to generate S (where S≥30) repeated sampled ranks of size m each. We sample with replacement, ensuring that each rank has the same probability of being selected in each round. This technique will avoid biased estimators for our ranks, by using a randomized sampling technique to estimate our ranks for each domain.

For each $S_i$ daily rank samples of size m, for each $D_i$ domain, we compute the statistic of interest: in this case, the sample mean. The central limit theorem proves that with a big enough sample (e.g., generally, at least 30), the sampling distribution of our computed statistics (mean) will follow a normal distribution.

Estimating the Most Likely Rank

Figure 4:
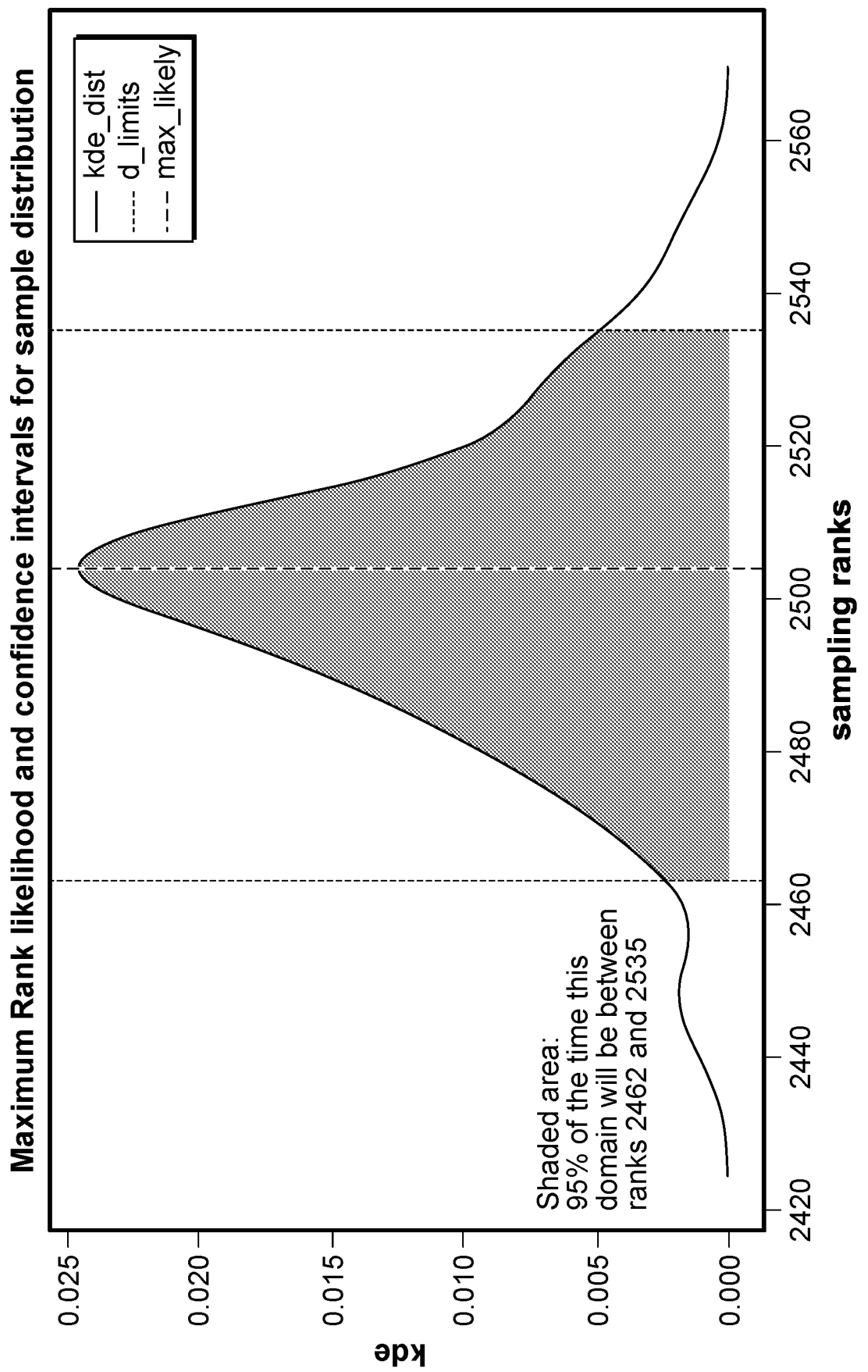
FIG. 4 is a graph that illustrates a maximum rank likelihood and rank intervals for sample distribution in accordance with some embodiments.

As an example, we aggregate the daily ranks associated with a domain "example.com" over seven days of data. The $R_1, \ldots, R_T$ daily ranks associated with this domain across the seven days are as follows: [2426, 2576, 2426, 2576, 2576, 2521, 2426]. We take S repeated samples of size m, in this case 30 repeated samples of size seven using bootstrap sampling with replacement and compute the mean for the seven sampled daily rank elements within each of these 30 repeated bootstraps. The mean sampling distribution for the domain "example.com" is shown in FIG. 4 as further described below, and we can observe that the normality approximation is accomplished.

Figure 3:
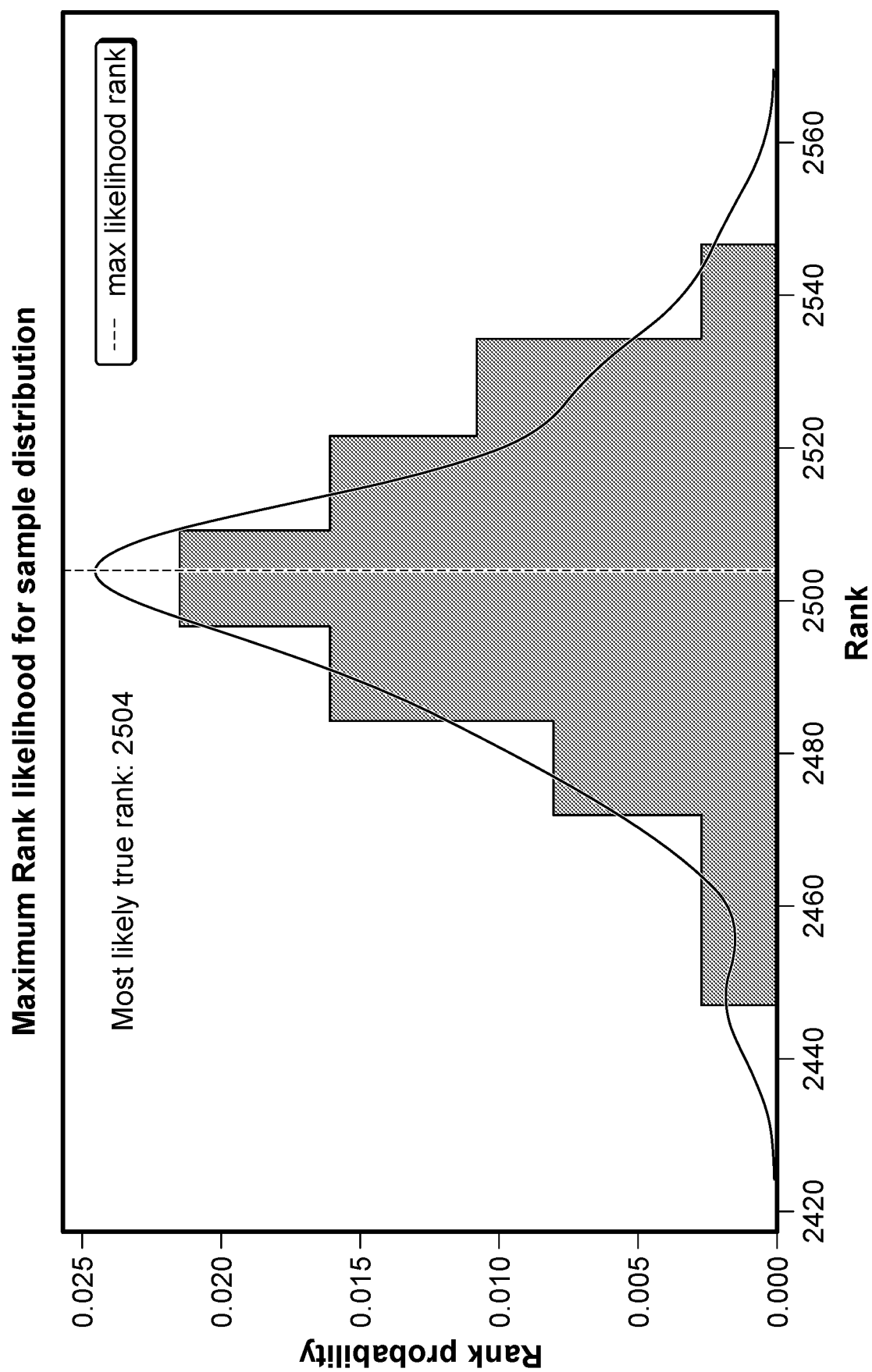
FIG. 3 is a graph that illustrates a maximum rank likelihood for sample distribution in accordance with some embodiments.

FIG. 3 is a graph that illustrates a maximum rank likelihood for sample distribution in accordance with some embodiments. From the sampling distribution, we can obtain the maximum likelihood for the sampling distribution (e.g., peak point: highest probability of occurrence). We can use the maximum likelihood to infer the most likely rank for that domain.

As shown in FIG. 3, using these disclosed techniques, we can infer a domain's most accurate rank (e.g., most likely rank) based on the maximum likelihood of our bootstrapped daily rank samples by domain. Furthermore, we can determine the range of ranks within which is the most likely rank for the domain, removing considerations of noise, lies.

Confidence Intervals for Ranks

FIG. 4 is a graph that illustrates a maximum rank likelihood and rank intervals for sample distribution in accordance with some embodiments. As shown in FIG. 4, using the sample means generated and with the normality assumption approximation being met, we can compute confidence intervals for the normalized ranks of each domain. Recall that we now have S rank sampling statistics that we will use to obtain our confidence intervals. With a 95% confidence level, we can confirm that 95% of the time the rank statistic will fall between (2462, 2535) for that week, leaving a 5% margin of error. With 99% confidence, we find that 99% of the time the domain's rank will fall between the ranks (r1+x, r2+x)—making the CI range larger. The end tails of the distribution that define the interval boundaries are the outlier sample statistics that are least likely to occur due to the variance in the environment.

In this case, the CI range is computed by subtracting the upper by the lower boundary (r2−r1). Following the same process for all D domains in the list, we can obtain CIs and CI ranges for each domain using the disclosed techniques. The next section shows the results and describes how rank certainty decreases as popularity decreases.

Interval Range Variation Analysis

Figure 5:
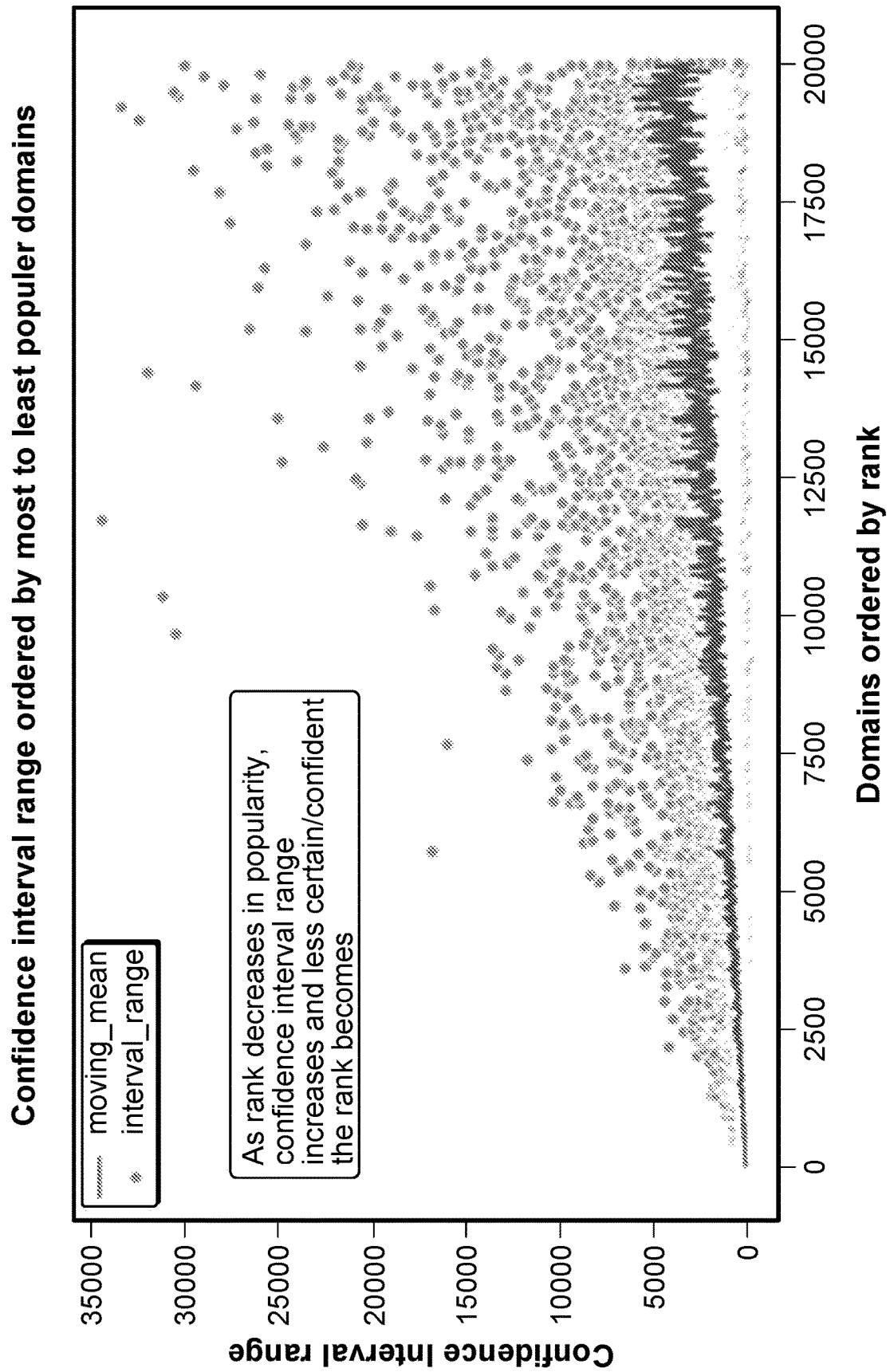
FIG. 5 is a plot that illustrates a confidence interval range ordered by most to least popular domains in accordance with some embodiments.

FIG. 5 is a plot that illustrates a confidence interval range ordered by most to least popular domains in accordance with some embodiments. The rank intervals allow us to obtain the interval range metric (r2−r1) to summarize information regarding the rank stability over the period of time evaluated. The plot shown in FIG. 5 contains the interval range in the y-axis, and the domains ordered by the most likely rank in the x-axis. The analysis shows that as the domain becomes less popular, the confidence interval range becomes wider. This generally occurs due to direct relationship of rank popularity versus variability: where the less popular a domain is (i.e., higher rank values), the higher the rank variability is (e.g., unpopular domains typically have very high rank variability).

Similarly, the more popular a domain is, the smaller the CI range becomes; this means that the ranks are more stable for highly popular domains, creating smaller CI ranges. Looking at the computed moving averages, we can observe the increasing trend as a domain becomes less popular. As an example, google[.]com has ranks across seven days of [3,4,4,4,2,4,4], obtaining a very small range of (3, 4). Example confidence metrics can include stable, somewhat stable, or unstable based on a measurable "believability" metrics based on confidence and variability of a domain rank over a period of time. Users have representative data over time, insights about stability and can choose to filter their data according to their use cases.

This approach allows domain ranks to "collide" with each other, meaning that they can have the same rank. A common approach used for observations that have the same count value is to order the data based on a random aspect of the data (e.g., lexicographically ordering) and assign different ranks even if they have the same count values and should be the same rank. Our method allows indicators (e.g., domains, as an example) to have the same ranks so we provide accurate information. An analogy is the ability to have two second place winners in a sports competition.

Alternate Configurability

Our approach allows the user to combine and select the data appropriately, according to their use case. For example, if a consumer wants to rely on domains that have high rank stability over time, they can choose to select only domains that have very low rank variation.

Example System Embodiments for Ranking Services and Top N Rank Lists

Figure 6:
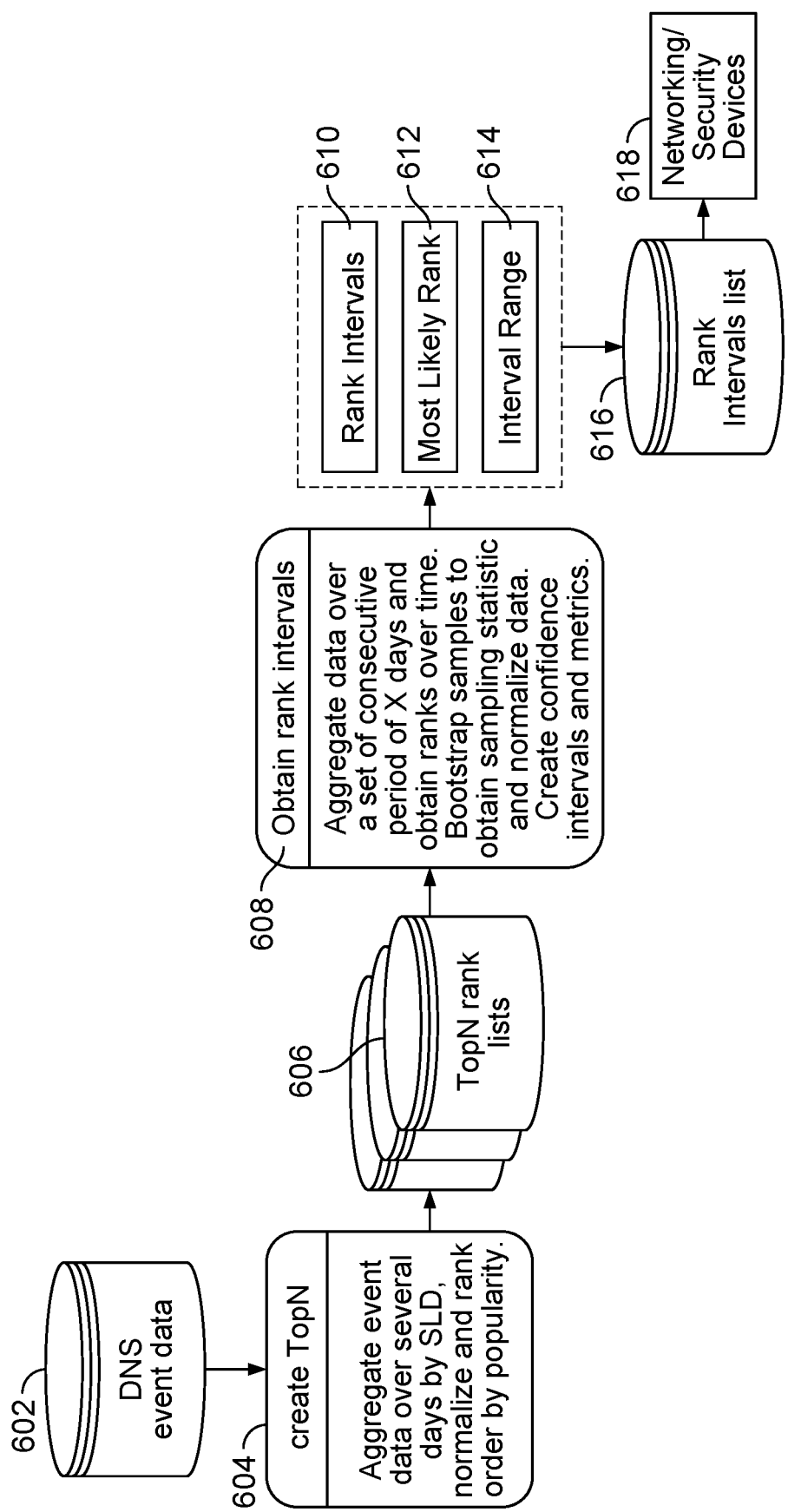
FIG. 6 illustrates a system diagram for ranking services and top N rank lists in accordance with some embodiments.

FIG. 6 illustrates a system diagram for ranking services and top N rank lists in accordance with some embodiments. For example, the disclosed techniques as similarly described above with respect to FIGS. 1-5 and further described below can be performed using the system embodiment shown in FIG. 6. The example system can be implemented using server class hardware in an on-premises data center or using a cloud-based data center.

Referring to FIG. 6, DNS event data is stored in a data store 602 (e.g., an example data storage solution, such as Amazon S3 can be used or other commercially available or open source data store solutions can similarly be used for these data store components of the system shown in FIG. 6). At 604, creating a Top N rank list is performed by aggregating the event data over several days by second-level domain (SLD), which is then normalized and ranked in order by popularity as similarly described above. The resulting Top N rank lists are stored in a data store as shown at 606.

At 608, obtaining rank intervals is performed by aggregating the data over a set of consecutive period of X days and obtaining ranks over time as similarly described above. Bootstrap samples are used to obtain sampling statistics and to normalize the data. The system can then create confidence intervals and metrics as similarly described above. Specifically, the system generates Rank Intervals as shown at 610, Most Likely Rank as shown at 612, and an Interval Range as shown at 614. The Rank Intervals list is stored in a data store 616.

As 618, the resulting Rank Intervals list(s) are provided to/used by various network/security devices to perform networking and/or security related policy enforcement using the Rank Intervals list(s). For example, such improved Rank Intervals list(s) can facilitate more effectively identifying domains that can be allowed (e.g., whitelisted, as such are trusted domains/not security risks), blocked (e.g., blacklisted, as such are not trusted/security risks), and/or monitored using security enforcement, such as by various DNS related network/security monitoring devices/solutions.

InfoRanks Vs. Single Rank

Figure 7A:
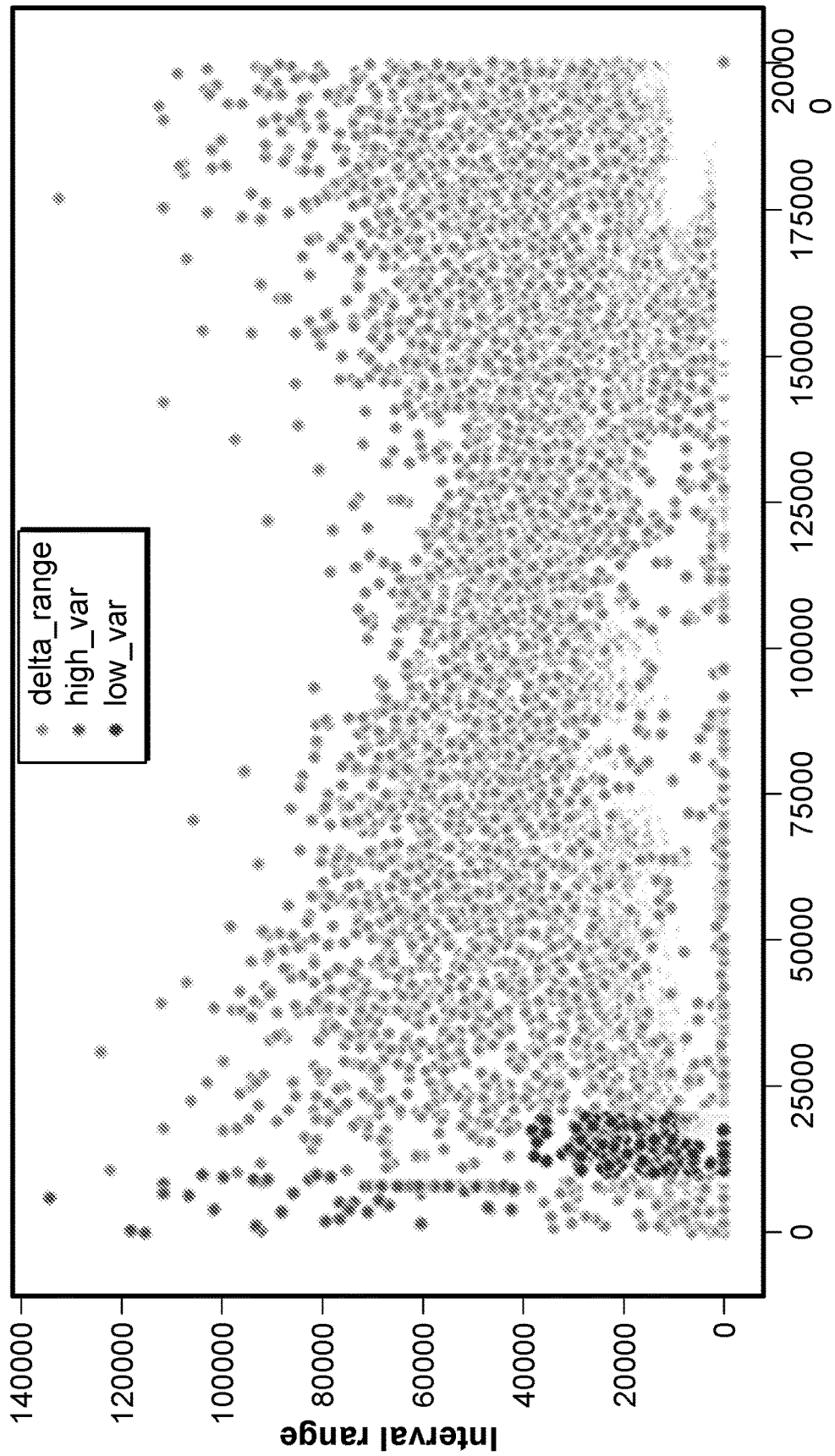
FIG. 7A is a plot that illustrates domains ordered by rank observed in a single day in accordance with some embodiments.

FIG. 7A is a plot that illustrates domains ordered by rank observed in a single day in accordance with some embodiments. In this section we describe in more detail the rank behavior and variability when using the estimated rank over a period of time, in comparison with a single day rank. As shown in the example illustrated in FIG. 7A, we subsetted for two scenarios: 1) domains that were highly popular (<10k) that have high variance in ranks, i.e., high range interval (range >40k rank difference) as shown in the plot of FIG. 7A; 2) in blue, we have a set of domains that have low variation in ranks (range <40k rank difference) and that have lower popularity than the ones in red (e.g., between 10k and 20k) as also shown in the plot of FIG. 7A. If we order them by the rank observed in a single rank, the highly unstable domains are ranked higher in popularity than the stable ones.

Figure 7B:
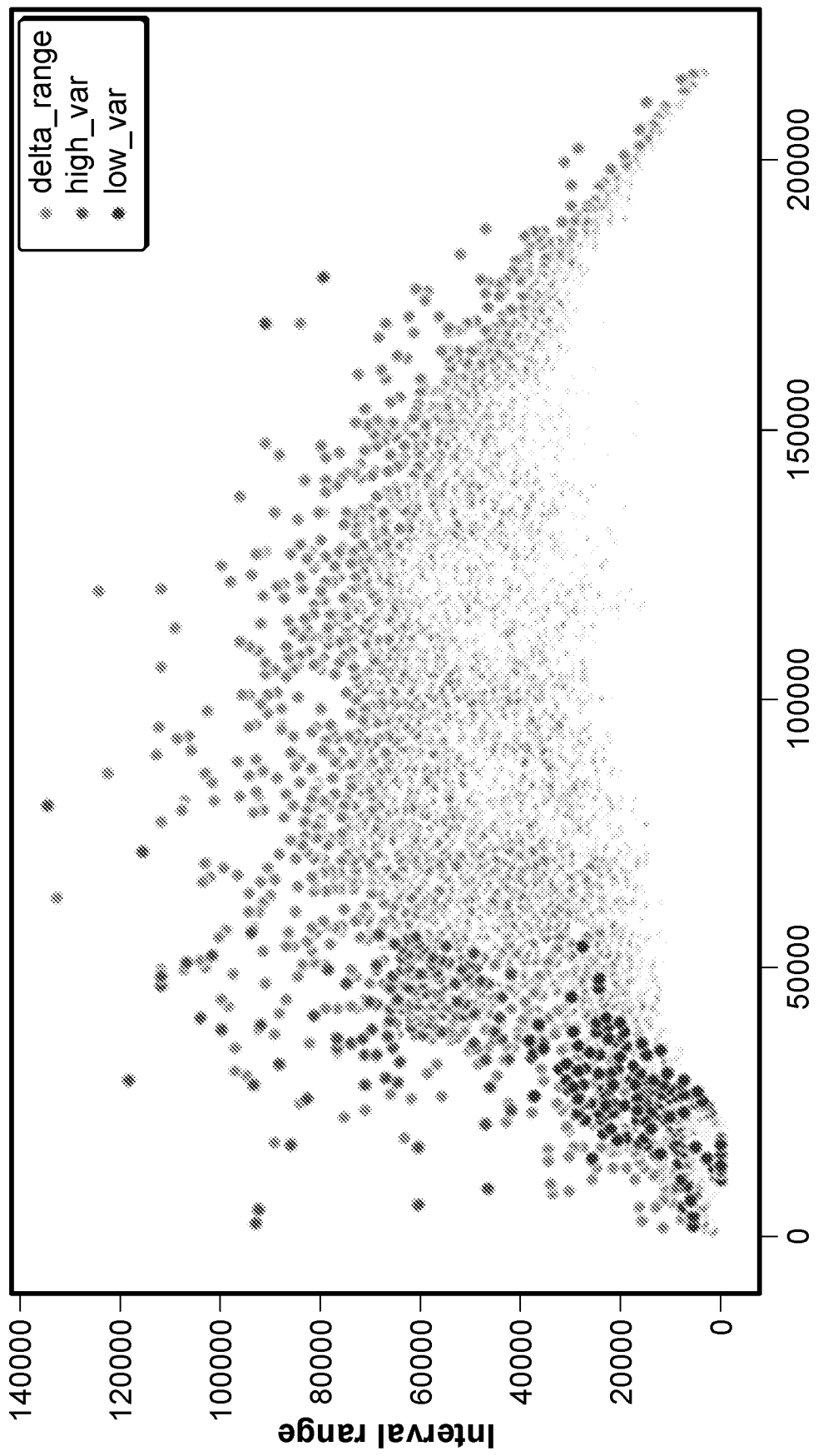
FIG. 7B is a plot that illustrates domains ordered by estimated most likely rank in accordance with some embodiments.

FIG. 7B is a plot that illustrates domains ordered by estimated most likely rank in accordance with some embodiments. The plot shown in FIG. 7B illustrates how the rank for these domains changes when using our estimated most likely rank, that is more robust to variability. The disclosed techniques give more weight to those domains that have lower variation, and less weight to those very popular domains that contained high variability.

Instability Example

Figure 8A:
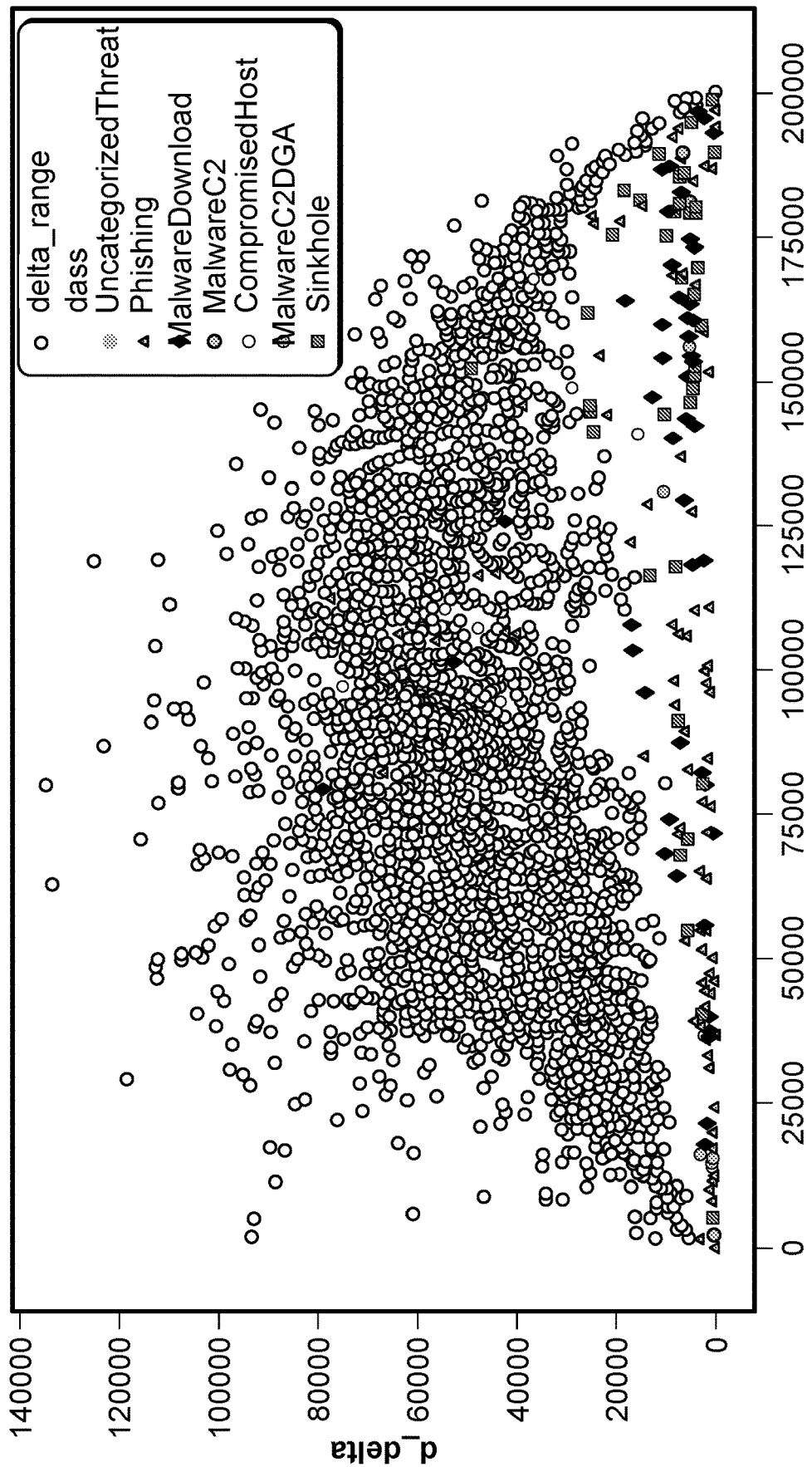
FIG. 8A is a plot that illustrates interval range by threat type in accordance with some embodiments.

FIG. 8A is a plot that illustrates interval range by threat type in accordance with some embodiments. Specifically, the plot shows the rank range variation for different types of threats. As such, we can identify domains that have a high rank variation and are considered unstable. We can also observe which domains have stable behavior and focus on mitigating threats that are consistently highly popular.

Figure 8B:
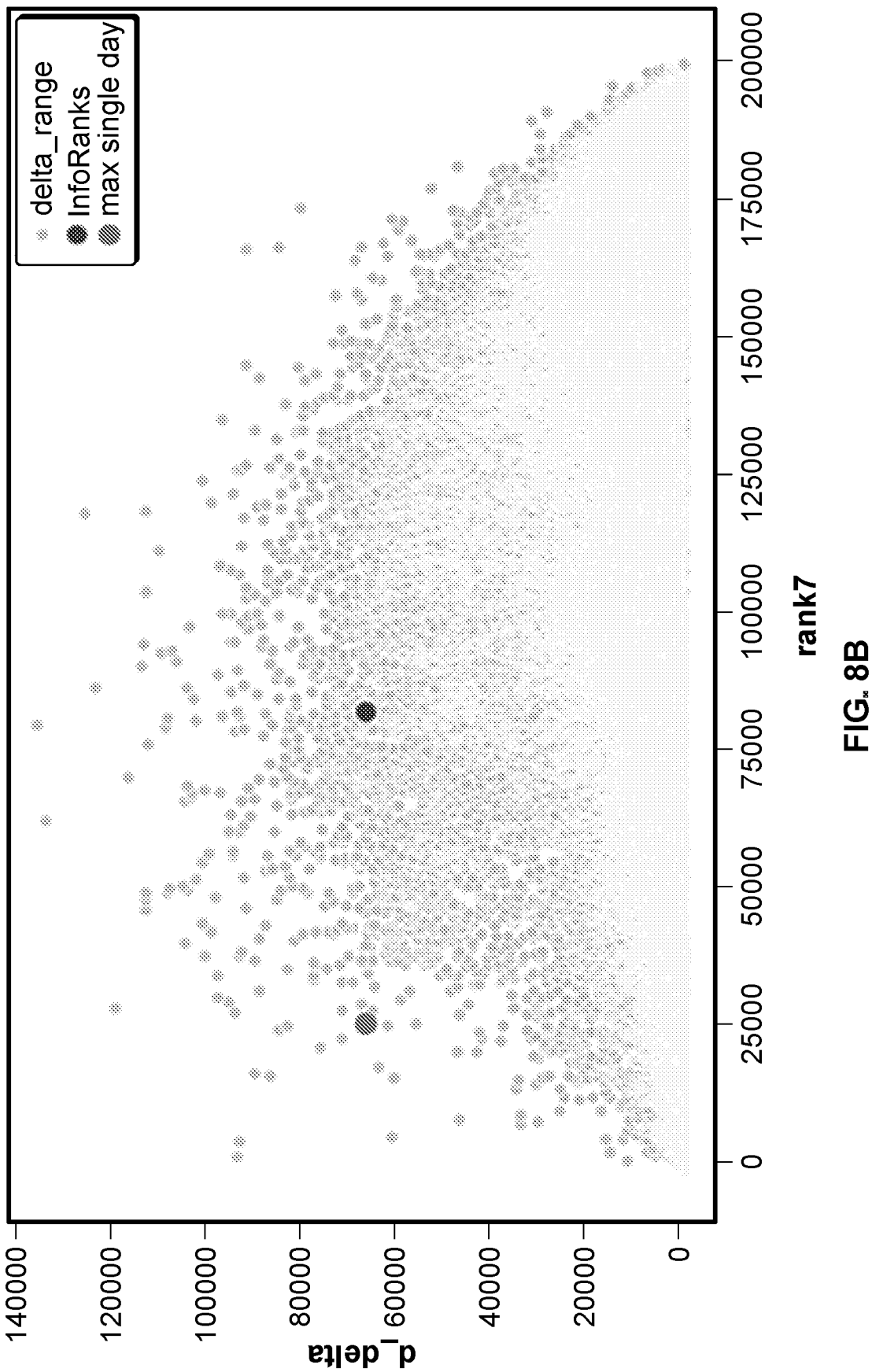
FIG. 8B is a plot that illustrates range and rank comparison by methods in accordance with some embodiments.

FIG. 8B is a plot that illustrates range and rank comparison by methods in accordance with some embodiments.

Variance in DNS traffic can be caused by malicious actors. A previously mentioned example are phishing domains that will typically have a strong, short-lived spike in traffic and could reach a highly popular rank (e.g., as shown in FIG. 8A). As shown in FIG. 8B, the plots show how a phishing domain (as an example) can reach a very popular rank if using prior approaches when considering count information for a single day, and how our disclosed InfoRanks techniques eliminate the ability for this unstable domain to reach a highly popular rank.

Providing a single rank for a domain is inaccurate as ranks vary across days. By providing a rank interval, we are able to provide accurate information that also informs the user regarding the domain instability over time to easily assess how much it varies in the DNS environment, and make reliable and confident decisions based on stable information.

Example Process Embodiments for Ranking Services and Top N Rank Lists

Figure 9:
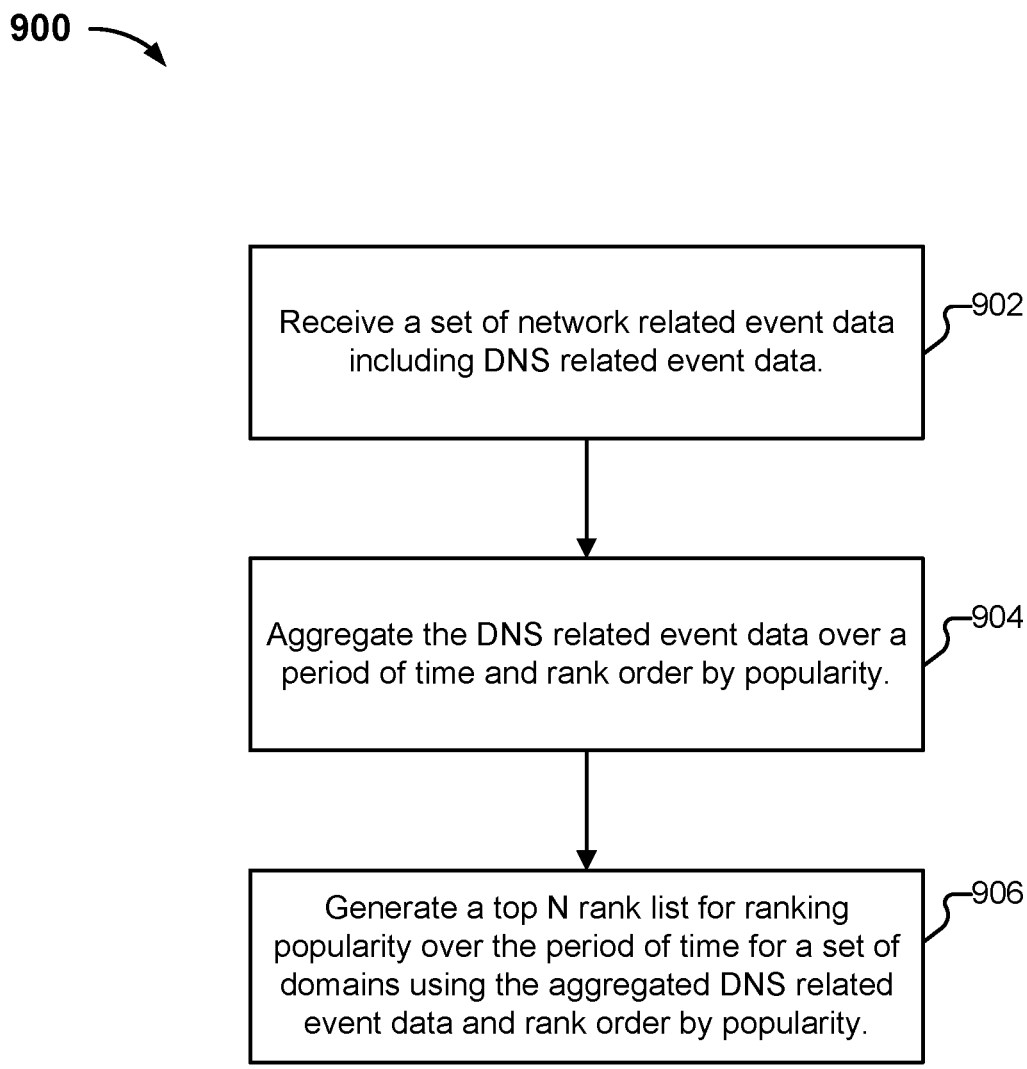
FIG. 9 is a flow diagram illustrating a process for ranking services and top N rank lists in accordance with some embodiments.

FIG. 9 is a flow diagram illustrating a process for ranking services and top N rank lists in accordance with some embodiments. In various embodiments, process 900 is performed by the system(s) (e.g., such as shown in FIG. 6 as described above) and processing techniques described above with respect to FIGS. 1 through 8B.

At 902, a set of network related event data is received. For example, the set of network related event data can include Domain Name System (DNS) related event data as similarly described above.

At 904, aggregating the DNS related event data over a period of time and rank order by popularity is performed as similarly described above.

At 906, generating a top N rank list for ranking popularity over the period of time for a set of domains using the aggregated DNS related event data and rank order by popularity is performed as similarly described above.

Figure 10:
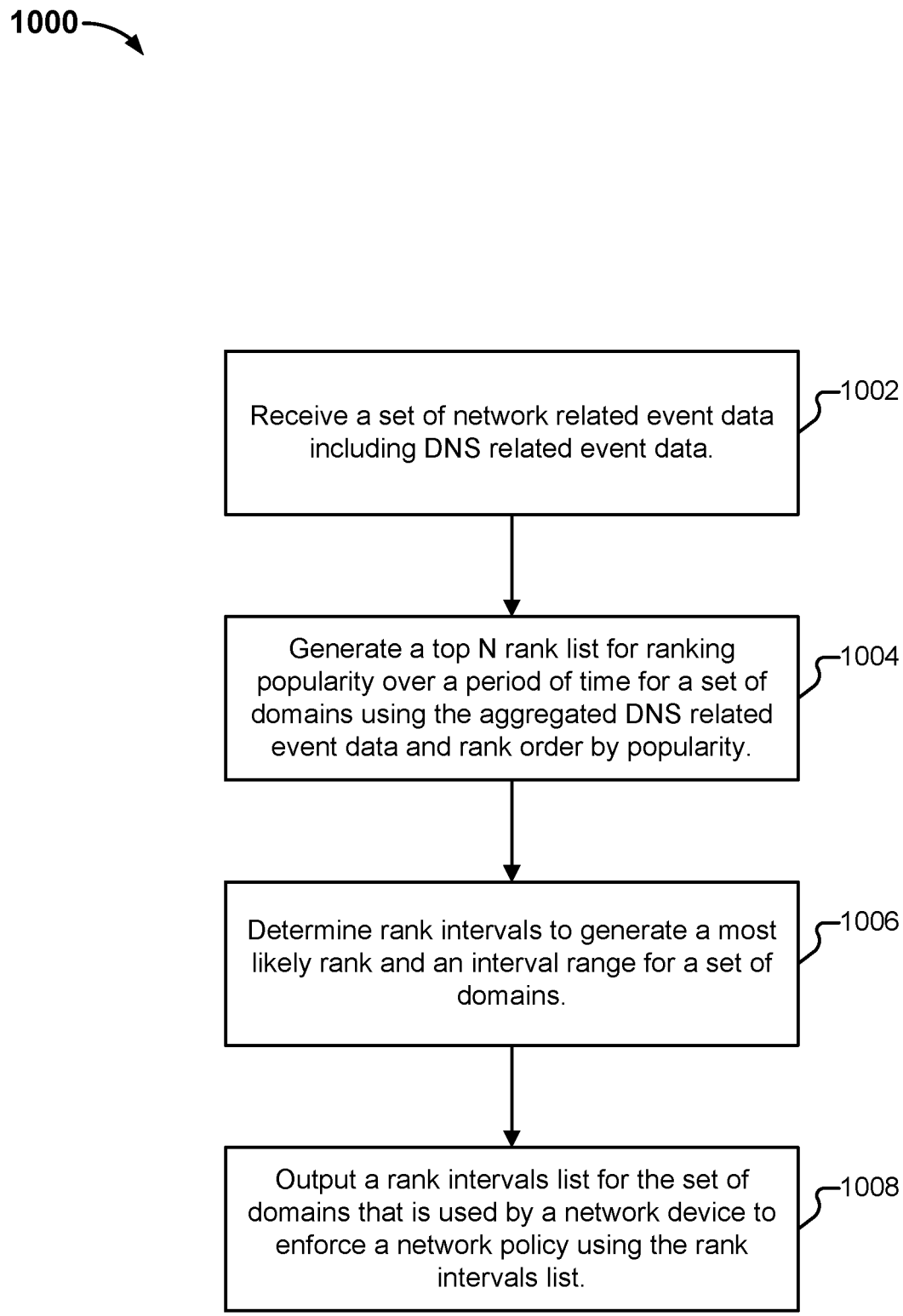
FIG. 10 is another flow diagram illustrating a process for ranking services and top N rank lists in accordance with some embodiments.

FIG. 10 is another flow diagram illustrating a process for ranking services and top N rank lists in accordance with some embodiments. In various embodiments, process 1000 is performed by the system(s) (e.g., such as shown in FIG. 6 as described above) and processing techniques described above with respect to FIGS. 1 through 8B.

At 1002, a set of network related event data is received. For example, the set of network related event data can include Domain Name System (DNS) related event data as similarly described above.

At 1004, generating a top N rank list for ranking popularity over a period of time for a set of domains using the aggregated DNS related event data and rank order by popularity is performed as similarly described above.

At 1006, determining rank intervals to generate a most likely rank and an interval range for a set of domains is performed as similarly described above.

At 1008, a rank intervals list for the set of domains is output that is used by a network device to enforce a network policy using the rank intervals list. For example, rank intervals to generate a most likely rank and an interval range for the set of domains can be determined and output to the network device for enforcing a network policy using the rank intervals list (e.g., the rank intervals list can be output to a DNS device, such as a DNS appliance, and/or another type of network/security device that can filter DNS requests using the rank intervals list) as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a set of network related event data, wherein the set of network related event data includes Domain Name System (DNS) related event data;
aggregate the DNS related event data over a period of time and rank order by popularity;
generate a top N rank list for ranking popularity over the period of time for a set of domains using the aggregated DNS related event data and rank order by popularity;
determine, using the top N rank list, rank intervals to generate a most likely rank and an interval range for the set of domains;
normalize the interval range for the set of domains based on a preset confidence interval to determine a normalized interval range for the set of domains;
output a rank intervals list for the set of domains based on the most likely rank and the normalized interval range for the set of domains; and
enforce a network policy using the rank intervals list, comprising to:
identify domains for a whitelist and/or a blacklist using the rank intervals list; and
a memory coupled to the processor and configured to provide the processor with instructions.

2. The system recited in claim 1, wherein the determining of the rank intervals using the top N rank list comprises to aggregate the set of network related event data over a set of consecutive period of days to obtain ranks over the period of time for the set of domains.

3. A method, comprising:
receiving a set of network related event data, wherein the set of network related event data includes Domain Name System (DNS) related event data;
aggregating the DNS related event data over a period of time and rank order by popularity;
generating a top N rank list for ranking popularity over the period of time for a set of domains using the aggregated DNS related event data and rank order by popularity;
determining, using the top N rank list, rank intervals to generate a most likely rank and an interval range for the set of domains;
normalizing the interval range for the set of domains based on a confidence interval to determine a normalized interval range for the set of domains;
outputting a rank intervals list for the set of domains based on the most likely rank and the normalized interval range for the set of domains; and
enforcing a network policy using the rank intervals list, comprising:
identifying domains for a whitelist and/or a blacklist using the rank intervals list.

4. The method of claim 3, wherein the determining of the rank intervals using the top N rank list comprises:
aggregating the data over a set of consecutive period of days to obtain ranks over the period of time for a set of domains.

5. A computer program product, the computer program product being embodied in a non-transitory, tangible computer readable storage medium and comprising computer instructions for:

receiving a set of network related event data, wherein the set of network related event data includes Domain Name System (DNS) related event data;

aggregating the DNS related event data over a period of time and rank order by popularity;

generating a top N rank list for ranking popularity over the period of time for a set of domains using the aggregated DNS related event data and rank order by popularity;

determining, using the top N rank list, rank intervals to generate a most likely rank and an interval range for the set of domains;

normalizing the interval range for the set of domains based on a confidence interval to determine a normalized interval range for the set of domains;

outputting a rank intervals list for the set of domains based on the most likely rank and the normalized interval range for the set of domains; and enforcing a network policy using the rank intervals list, comprising:

identifying domains for a whitelist and/or a blacklist using the rank intervals list.

6. The computer program product recited in claim 5, wherein the determining of the rank intervals using the top N rank list comprises aggregating the data over a set of consecutive period of days to obtain ranks over the period of time for a set of domains.

\* \* \* \* \*

UNITED STATES PATENT AND TRADEMARK OFFICE
CERTIFICATE OF CORRECTION

PATENT NO. : 11,681,767 B2
APPLICATION NO. : 17/161436
DATED : June 20, 2023
INVENTOR(S) : Laura Teixeira da Rocha and Renée Carol Burton It is certified that error appears in the above-identified patent and that said Letters Patent is hereby corrected as shown below:

In the Specification

In Column 4, Line 43, after "where", delete "a" and insert --α--, therefor.

In Column 4, Line 60, after "for", delete "a" and insert --α--, therefor.

Signed and Sealed this
Fourteenth Day of November, 2023

Katherine Kelly Vidal
*Director of the United States Patent and Trademark Office*